(12) United States Patent
Deshpande et al.

(10) Patent No.: US 9,740,749 B2
(45) Date of Patent: Aug. 22, 2017

(54) CONTEXTUALIZATION OF ENTITY RELATIONSHIPS

(71) Applicant: International Business Machines Corporation, Armonk, NY (US)

(72) Inventors: Prasad Manikarao Deshpande, Bangalore (IN); Atreyee Dey, Bangalore (IN); Rajeev Gupta, Noida (IN); Sriram K. Padmanabhan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 412 days.

(21) Appl. No.: 14/462,993

(22) Filed: Aug. 19, 2014

(65) Prior Publication Data

US 2016/0055158 A1 Feb. 25, 2016

(51) Int. Cl.
*G06F 17/00* (2006.01)
*G06F 17/30* (2006.01)

(52) U.S. Cl.
CPC .... *G06F 17/3053* (2013.01); *G06F 17/30315* (2013.01); *G06F 17/30864* (2013.01)

(58) Field of Classification Search
CPC .. G06F 17/3053; G06F 21/6254; G06F 3/067; G06F 3/0482; G06F 3/04842; G06F 2009/45595
See application file for complete search history.

(56) References Cited

U.S. PATENT DOCUMENTS

| 8,050,998 | B2 | 11/2011 | Bolivar et al. |
| 2002/0038296 | A1* | 3/2002 | Margolus .......... G06F 17/30097 |
| 2005/0021522 | A1 | 1/2005 | Herman et al. |
| 2012/0246093 | A1* | 9/2012 | Stibel .................... G06Q 30/00 705/347 |
| 2012/0331004 | A1 | 12/2012 | Fueta et al. |
| 2013/0155068 | A1 | 6/2013 | Bier et al. |

OTHER PUBLICATIONS

IBM, "IBM InfoSphere Master Data Management", available at: http://www-03.ibm.com/software/products/en/infosphere-master-data-management/, Accessed on Jun. 19, 2014, 4 pages.

(Continued)

*Primary Examiner* — Truong Vo
(74) *Attorney, Agent, or Firm* — Ference & Associates LLC (57) ABSTRACT

Methods and arrangements for identifying related data in different data sets to assist in searching the data sets. A first data asset and a second data asset are accessed. Common entities are identified between the first and second data assets. A score is determined for the relationship between the first and second data assets, based on the identified common entities. One or more relationship contexts are determined for the relationship between the first and second data assets, and the relationship score and one or more relationship contexts are used to join at least a portion of each of the first and second data assets as a basis for subsequent searching. Other variants and embodiments are broadly contemplated herein.

20 Claims, 6 Drawing Sheets

(56) References Cited

OTHER PUBLICATIONS

Murthy, Karin et al., "Exploiting Evidence from Unstructured Data to Enhance Master Data Management", Proceedings of the VLDB Endowment, Aug. 27-31, 2012, Istanbul, Turkey, pp. 1862-1873, vol. 5, No. 12, 2012 VLDB Endowment, San Jose, California, USA.
Wu, Eugene et al., "Scorpion: Explaining Away Outliers in Aggregate Queries", Proceedings of the VLDB Endowment, Aug. 26-30, 2013, Riva del Garda, Trento, Italy, 12 pages, vol. 6, No. 8, 2013 VLDB Endowment, San Jose, California, USA.
Bhalotia, Gaurav et al., "Keyword Searching and Browsing in Databases using Banks", Proceedings of the 18th International Conference on Data Engineering (ICDE'02), Feb. 26, 2002-Mar. 1, 2002, San Jose, CA, USA, 10 pages, IEEE Digital Library.
Roy, Prasan et al., "Towards Automatic Association of Relevant Unstructured Content with Structured Query Results", CIKM'05, Oct. 31-Nov. 5, 2005, Bremen, Germany, 8 pages, ACM Digital Library.
Dong, Xin Luna et al., "Big Data Integration", Proceedings of the VLDB Endowment, Aug. 26-30, 2013, Riva del Garda, Trento, Italy, pp. 1188-1189, vol. 6, No. 11, 2013 VLDB Endowment, San Jose, California, USA.
Venetis, Petros et al., "Recovering Semantics of Tables on the Web", Proceedings of the VLDB Endowment, Aug. 29-Sep. 3, 2011, Seattle, Washington, USA, pp. 528-538, vol. 4, No. 9, 2011 VLDB Endowment, San Jose, California, USA.
Sarma, Anish Das et al., "Finding Related Tables", SIGMOD'12, May 20-24, 2012, Scottsdale, Arizona, USA, pp. 817-828, ACM Digital Library.

\* cited by examiner

Asset2

| Name | TaxSlab | Region | Others2 | isMatch |
|------|---------|--------|---------|---------|
| n1 | L | r1 | o12 | True |
| n4 | M | r1 | o42 | True |
| n5 | L | r1 | o52 | True |
| n6 | L | r4 | o62 | False |
| n7 | H | r3 | o72 | False |
| n8 | H | r2 | o82 | False |

CONTEXTUALIZATION OF ENTITY RELATIONSHIPS

BACKGROUND

The handling of "big data" is popular for affording parallelized large-scale data processing and is employed in a great variety of settings. The mining and processing of data in this setting have proven to be valuable to businesses and other entities, e.g., in determining or understanding a potential customer base. Data can originally derive from a great variety of sources, including social media, news and other online sources. The data may then be processed in large-scale distributed parallel computing systems, such as Hadoop® clusters. Hadoop® is an open source implementation of MapReduce by Google®, and is a registered trademark of the Apache Software Foundation.

The desirability of providing a search and browsing interface for data, such as in settings as just described, has long been noted. However, conventional efforts in that connection have generally fallen short in providing a significant degree of versatility and utility, inasmuch as individual assets (or specifically defined sets of data) tend only to be searchable independently.

BRIEF SUMMARY

In summary, one aspect of the invention provides a method of identifying related data in different data sets to assist in searching the data sets, the method comprising: utilizing at least one processor to execute computer code configured to perform the steps of: accessing a first data asset and a second data asset; identifying entities common to the first and second data assets; determining a score for a relationship between the first and second data assets, based on the identified common entities; determining one or more relationship contexts for the relationship between the first and second data assets; and using the relationship score and one or more relationship contexts to join at least a portion of each of the first and second data assets as a basis for subsequent searching.

Another aspect of the invention provides an apparatus identifying related data in different data sets to assist in searching the data sets, the apparatus comprising: at least one processor; and a computer readable storage medium having computer readable program code embodied therewith and executable by the at least one processor, the computer readable program code comprising: computer readable program code configured to access a first data asset and a second data asset; computer readable program code configured to identify entities common to the first and second data assets; computer readable program code configured to determine a score for a relationship between the first and second data assets, based on the identified common entities; computer readable program code configured to determine one or more relationship contexts for the relationship between the first and second data assets; and computer readable program code configured to use the relationship score and one or more relationship contexts to join at least a portion of each of the first and second data assets as a basis for subsequent searching.

An additional aspect of the invention provides a computer program product for determining relationships between data assets, the computer program product comprising: computer readable program code configured to access a first data asset and a second data asset; computer readable program code configured to identify entities common to the first and second data assets; computer readable program code configured to determine a score for a relationship between the first and second data assets, based on the identified common entities; computer readable program code configured to determine one or more relationship contexts for the relationship between the first and second data assets; and computer readable program code configured to use the relationship score and one or more relationship contexts to join at least a portion of each of the first and second data assets as a basis for subsequent searching.

A further aspect of the invention provides a method comprising: accessing a first data asset and a second data asset; identifying a relationship between the first and second data assets, via identifying entities common to the first and second data assets; the identifying of common entities comprising searching among columnar values in the first and second data assets; determining a score for the relationship between the first and second data assets; determining relationship contexts for the relationship between the first and second data assets; determining a score for each of the relationship contexts; and using the relationship score and relationship context scores to join at least a portion of each of the first and second data assets as a basis for subsequent searching, via: applying a threshold to present one or more relationships for searching across both of the first and second assets; the applying of a threshold comprising determining a ratio of a score for one of the relationship contexts by dividing the relationship context score by the relationship score; and comparing the ratio to the threshold.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an exemplary embodiment, most if not all of the process steps, components and outputs discussed with respect to FIGS. 1-4 can be performed or utilized by way of a processing unit or units and system memory such as those indicated, respectively, at 16' and 28' in FIG. 6, whether on a server computer, a client computer, a node computer in a distributed network, or any combination thereof.

Broadly contemplated herein, in accordance with at least one embodiment of the invention, are systems for extracting and storing relationships among data assets, where at least one of the assets is structured, while the other asset may be structured or unstructured. This extracting and storing can involve: extracting keywords from both assets and matching with corresponding columns; declaring an entity match if keywords match with respect to a given minimum score; and using matched entities to assign scores to one or more relationships between assets. Additionally, there are broadly contemplated herein systems and methods for associating context with asset relationships, involving: finding the common entities; find predicates via determining which filtered data has a greater fraction of common entities (e.g., greater than or equal to a given minimum ratio/fraction). Here, predicates can optionally be characterized using keywords. These and other features relating to at least one embodiment of the invention will be better appreciated from the discussion which follows.

Broadly contemplated herein, in accordance with at least one embodiment of the invention, are methods and arrangements for providing an integrated, connected or holistic view over data between individual assets to permit more versatile and flexible searching among a totality of data assets.

Figure 1:
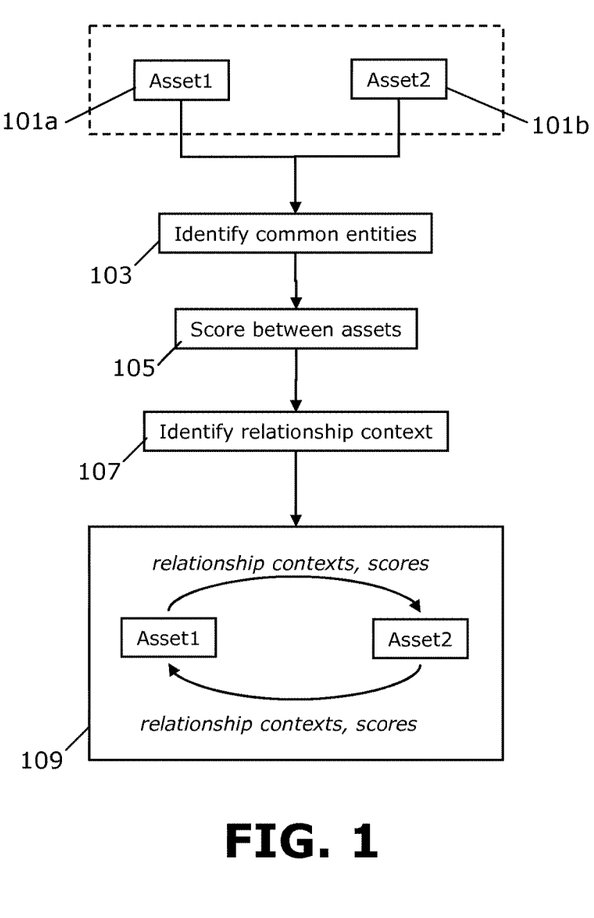
FIG. 1 schematically illustrates a process for joining data assets in preparation for search.

FIG. 1 schematically illustrates a process for joining data assets in preparation for search, in accordance with at least one embodiment of the invention. Illustrated are two data assets 101*a/b* (also labeled "Asset1" and "Asset2") which may result, e.g., from data mining of "big data". Entity-based relationships can be found among the assets (103), and a score can be applied to each of these relationships (105). The context for each relationship can then be identified (107) and a score can be associated with each such relationship context.

In accordance with at least one embodiment of the invention, a user may perform a keyword search and/or browse over the assets 101*a/b*, and the established relationship contexts and scores can play a role to assist in this regard; this is generally illustrated at 109. This leveraging of relationship contexts and scores will be better appreciated from further discussion below, inasmuch as user searching and browsing can be thereby facilitated and enhanced.

In accordance with at least one embodiment of the invention, for the step of identifying common entities (103), if both assets 101*a/b* are structured, then any of a wide variety of known techniques may be employed. (By way of merely illustrative example, suitable techniques are discussed in Xin Luna Dong et al, "Big Data Integration", VLDB 2013 [39$^{th}$ International Conference on Very Large Data Bases, Riva del Garda, Trento, Italy]). On the other hand, if at least one of the assets 101*a/b* is unstructured, then techniques may be employed where partial key-value pairs are extracted, the extracted entities are matched with structured entities, and matching entities are identified.

Figure 2:
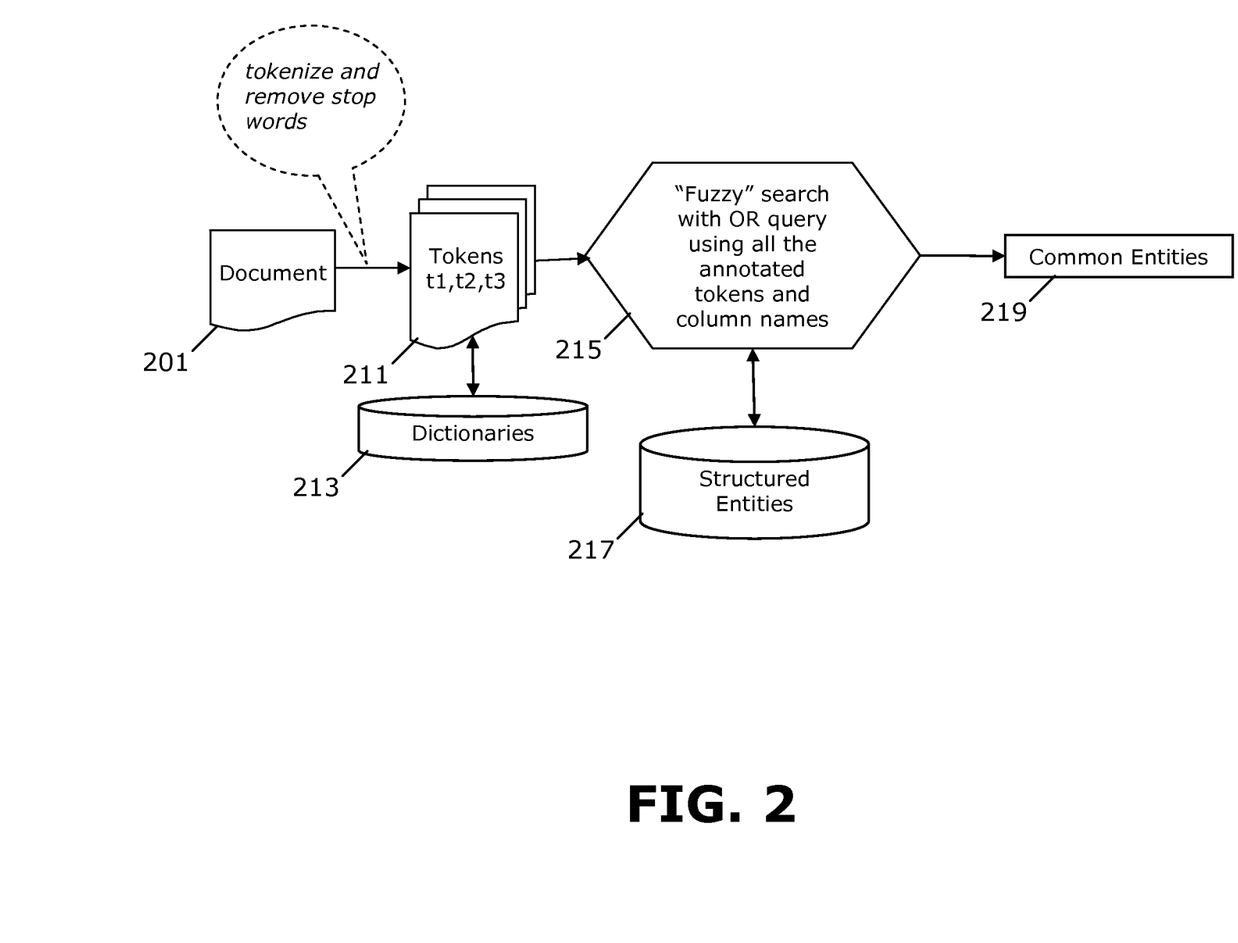
FIG. 2 schematically illustrates a sample process for determining common entities between two assets when at least one of the assets is structured.

As such, in accordance with at least one embodiment of the invention, FIG. 2 schematically illustrates an example of a process for determining common entities between two assets when one is structured and the other is unstructured. As shown, an asset may comprise a document 201. Via any of a variety of suitable techniques, the document may be tokenized, with stop words removed, to yield tokens 211. On referring to a database of dictionaries 213, the tokens can be annotated and placed in columnar form. A (fuzzy) search 215 may then be performed using an "OR" query, using the annotated tokens and column names, with respect to structured entities 217 extracted from the structured asset. Based on the search 215, common entities 219 between the assets can be identified.

In accordance with at least one embodiment of the invention, a wide variety of suitable processes may be employed for quantifying or scoring entity relationships (e.g., as with step 105 in FIG. 1). A working example follows, which employs a Jaccard index or Jaccard similarity coefficient.

Thus, in accordance with at least one embodiment of the invention, it is initially recognized that an asset may describe or include a portion of those entities which are present in the other asset; essentially, these would be the common entities described above. Generally, the Jaccard index (or score) measures similarity between finite sample sets (e.g., assets 101*a/b* from FIG. 1, where each asset can be regarded as a set of entities) and is defined as the size of the intersection divided by the size of the union of the sample sets. Accordingly, if a given asset $A_1$ describes 1000 entities and another asset $A_2$ describes 200 entities, wherein 50 entities are common between these assets, the Jaccard index is 50/(1000+200−50)=0.0435. Alternatively, entity relationships can be quantified uni-directionally (from one asset to the other); thus, the Jaccard index in a direction from $A_1$ to $A_2$ would be 50/1000=0.05, while in the reverse direction it would be 50/200=0.25.

In accordance with at least one embodiment of the invention, a wide variety of suitable processes may be employed for identifying relationship context (e.g., as with step 107 in FIG. 1). As such, a determination of relationship context can help with an understanding of one or more factors that might account for similarity scores as just described, and this context can assist in revising a user's parameters or setup for search or browsing. In other words, inasmuch as common entities may well be found between assets, accounting for context can modify any overview or assessment of such commonalities if it turns out that some such commonalities may not be useful in view of their associated context. For instance, if $A_1$ includes information about customers in Asian countries in general, while $A_2$ includes information about Japanese customers but from no other Asian countries, then it can be deduced that a relationship between $A_1$ and $A_2$ (e.g., as quantified by a Jaccard or other similarity score as noted above) may primarily derive from commonalities relating to Japanese customers. Thus, with this relationship context at hand, a search for Chinese customers across both assets $A_1$ and $A_2$ can be said to have little or nothing to do with the determined relationship between $A_1$ and $A_2$; thus, it can be concluded that the established context of common entities in this case will be of little use to the user's search.

Thus, in accordance with at least one embodiment of the invention, to identify relationship context, by way of an illustrative working example, reference can be made to the equation below. Here, all column values which contextually identify extracted entities are found, where E represents all entities in an asset and e represents entities in the asset with a contextual predicate. Thus:

$$\text{Structured entities} = E$$

$$\text{Extracted entities} = e$$

$$\text{Find all predicates } p \text{ s.t. } S_{1\to2}(p) = \frac{J_{1\overset{p}{\to}2(e)}}{J_{1\to2}(E)} \geq \lambda$$

Here, the predicate p can represent any factor to be used as a basis of helping assess the degree to which common entities are accounted for by that factor. For its part, $\lambda$ is a threshold that can be chosen to establish indeed whether a given context (accounted for by a predicate, which itself could represent a category or class of one or more assets) does account for a certain proportion of all common entities.

Figure 3:
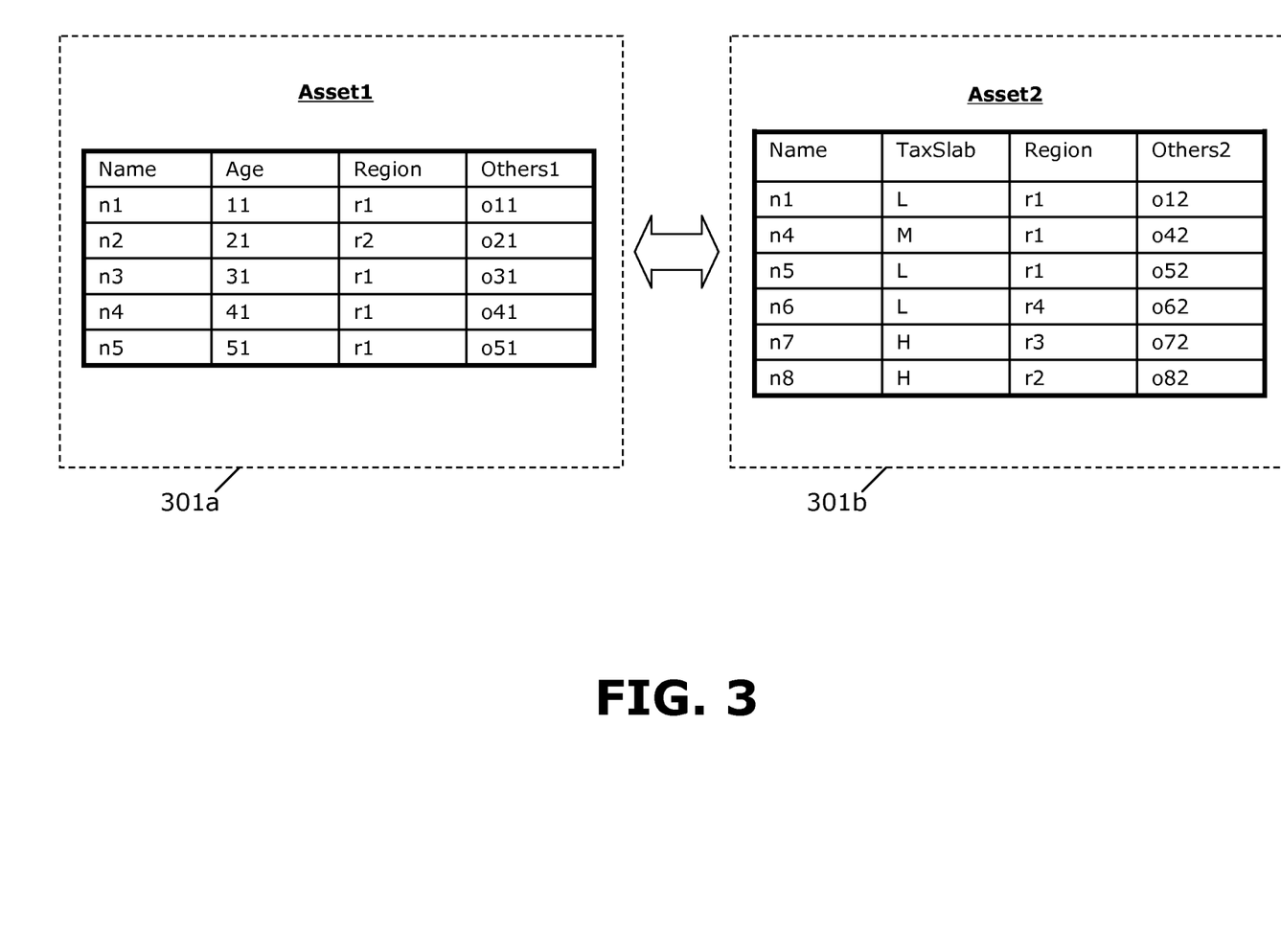
FIG. 3 sets forth two assets, for which similarity and relationship context are to be determined.

By way of an illustrative working example, in accordance with at least one embodiment of the invention, FIG. 3 sets forth two assets 301a/b ("Asset1" and "Asset2", respectively), for which similarity and relationship context are to be determined. Each asset contains several entities (one per row), each presenting values in different categories (one in each column); any of these categories can correspond to the predicate p in the above equation. If "Name" represents the matching column between the assets in the present working example, then the uni-directional Jaccard index from Asset1 to Asset2 is 3/5=0.6, while that in the reverse direction is 3/6=0.5 (In other words, 3 out of the 5 names present in Asset1 are also present in Asset2, while with respect to Asset2 this ratio is 3 out of 6.)

In accordance with at least one embodiment of the invention, continuing with the present working example, a modified Jaccard index $$J_{1\overset{p}{\to}2}(e)$$

can be calculated on a basis where p represents any case where region=r1. Thus, this quantity would be 3/4=0.75 and in the reverse direction would be 3/3=1.0. Using the formula for S noted above, to determine whether "region=r1" represents a context in any of the entity relationships, the quantity S in a direction from Asset1 to Asset2 can then be calculated as 0.75/0.6=1.25, while that in the reverse direction can be calculated as 1/0.5=2. By way of another example, "TaxSlab=L" can represent a context in the direction from Asset2 to Asset1, whereupon the quantity S can be calculated as 1.3. Thresholding may take place for any value desired. Preferably, the threshold $\lambda$ should be set to be greater than 1, depending on any requirements or desired outcomes for the search and browsing at hand. If the value of S is greater than the specified threshold for a given context, then that context is assigned to the relationship.

Figure 4:
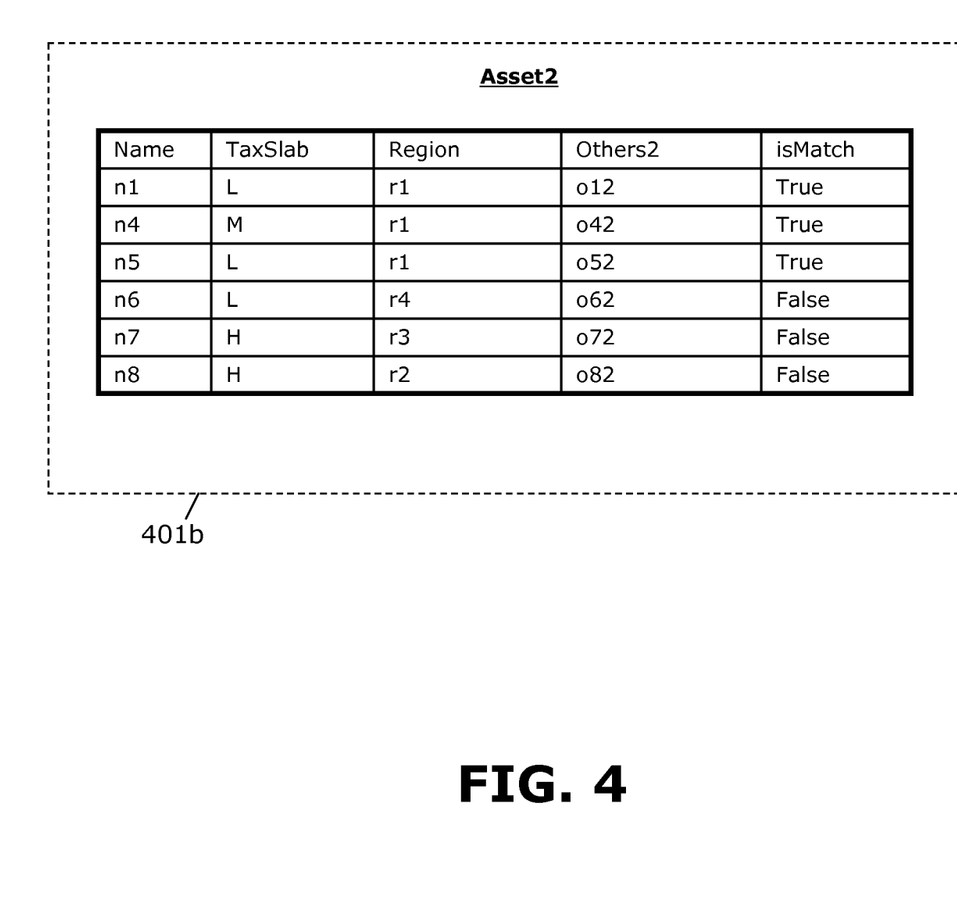
FIG. 4 sets forth one of the assets from FIG. 3, with the addition of a column indicating whether the row has any matching row in the other asset.

By way of an illustrative working example, in accordance with at least one embodiment of the invention, FIG. 4 sets forth an asset 401b, similar to that indicated at 301b in FIG. 3, with a column "isMatch" used to indicate whether the corresponding entity is common (matching) between assets. Here, a probabilistic binary decision tree can be employed to determine a uni-directional context from Asset2 to Asset1 of FIG. 3 (assets 401b and 401a, respectively). A decision tree is created with "isMatch" as the target variable and all other columns as decision variables. Contextual predicates are then obtained using decision tree algorithms. With this illustrative example, the predicate region=r1 is obtained.

In accordance with at least one embodiment of the invention, it should be noted that maximum coverage of matching entities is not necessarily vital. To this end, if the predicate is very complex, then the value of S is calculated for the predicate, and the predicate is parsed to obtain a simpler predicate (dropping a CNF term), thus resulting in a given minimum coverage for a value S greater than $\lambda$. For example, if the decision tree branch with (isMatch=true) returns a predicate (((region=r1) AND (city=Chicago OR city=Dallas)) OR ((region=r2) AND (12<age<23)), there will be a high value of S (greater than $\lambda$). Such a complex predicate may not be very useful to show to the user (e.g., it may be too complex for ready viewing/consumption) or for search and browsing (e.g., it may be difficult to associate keywords with such a predicate). Thus, instead, the predicates can be simplified by dropping some of the terms while ensuring that the value of S is above the threshold $\lambda$. In the example above, (region=r1) may satisfy that condition.

In accordance with at least one embodiment of the invention, quantitative scores and values as determined herein can be stored in memory or displayed to a user on a screen, as might fit the needs of one or more users.

Figure 5:
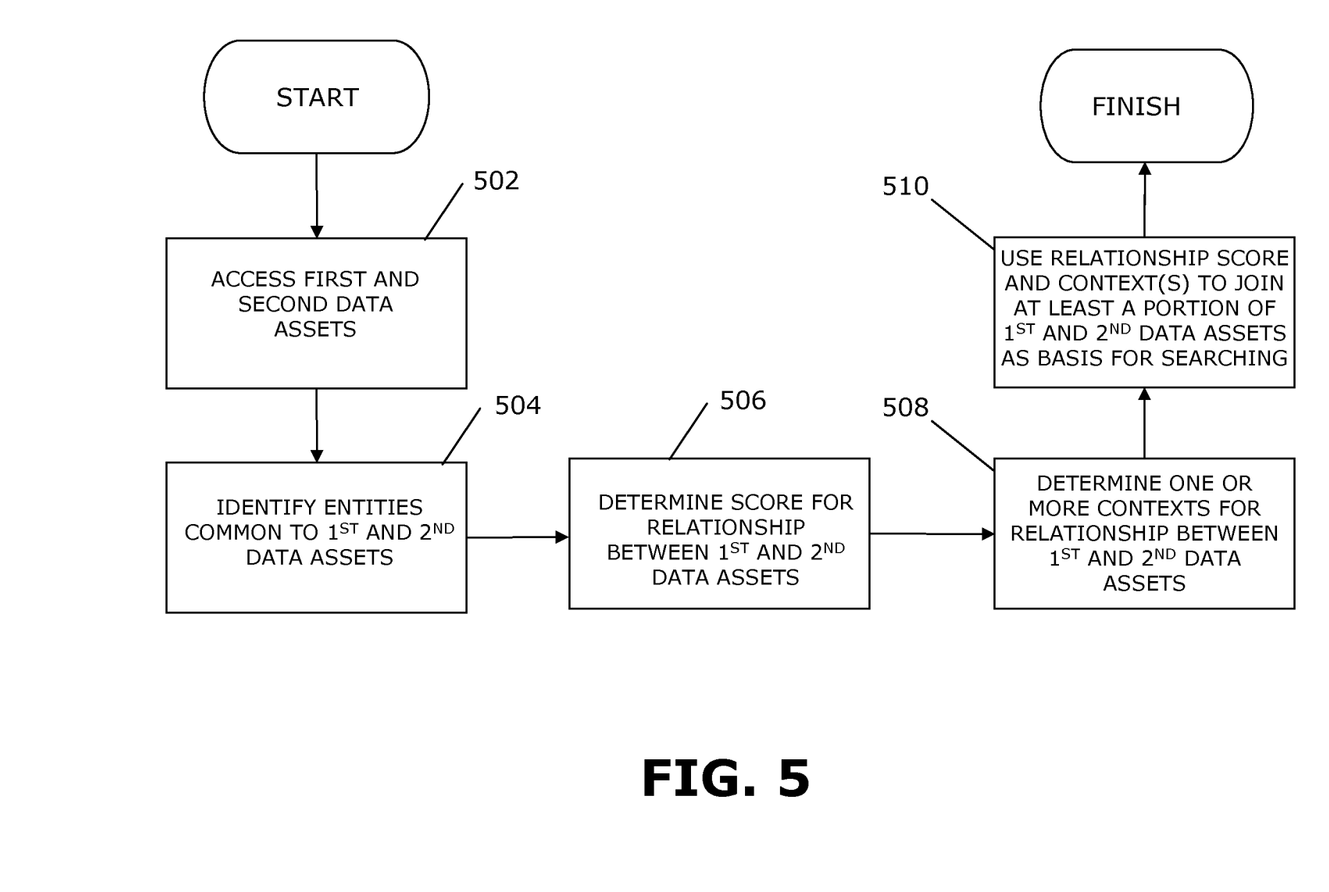
FIG. 5 sets forth a process more generally for identifying related data in different data sets to assist in searching the data sets.

FIG. 5 sets forth a process more generally for identifying related data in different data sets to assist in searching the data sets, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 5 can be performed by way of a processing unit or units and system memory such as those indicated, respectively, at 16' and 28' in FIG. 6.

As shown in FIG. 5, in accordance with at least one embodiment of the invention, a first data asset and a second data asset are accessed (502). Entities common to the first and second data assets are identified (504). A score is determined for the relationship between the first and second data assets, based on the identified common entities (506). One or more relationship contexts are determined for the relationship between the first and second data assets (508), and the relationship score and one or more relationship contexts are used to join at least a portion of each of the first and second data assets as a basis for subsequent searching (510).

Figure 6:
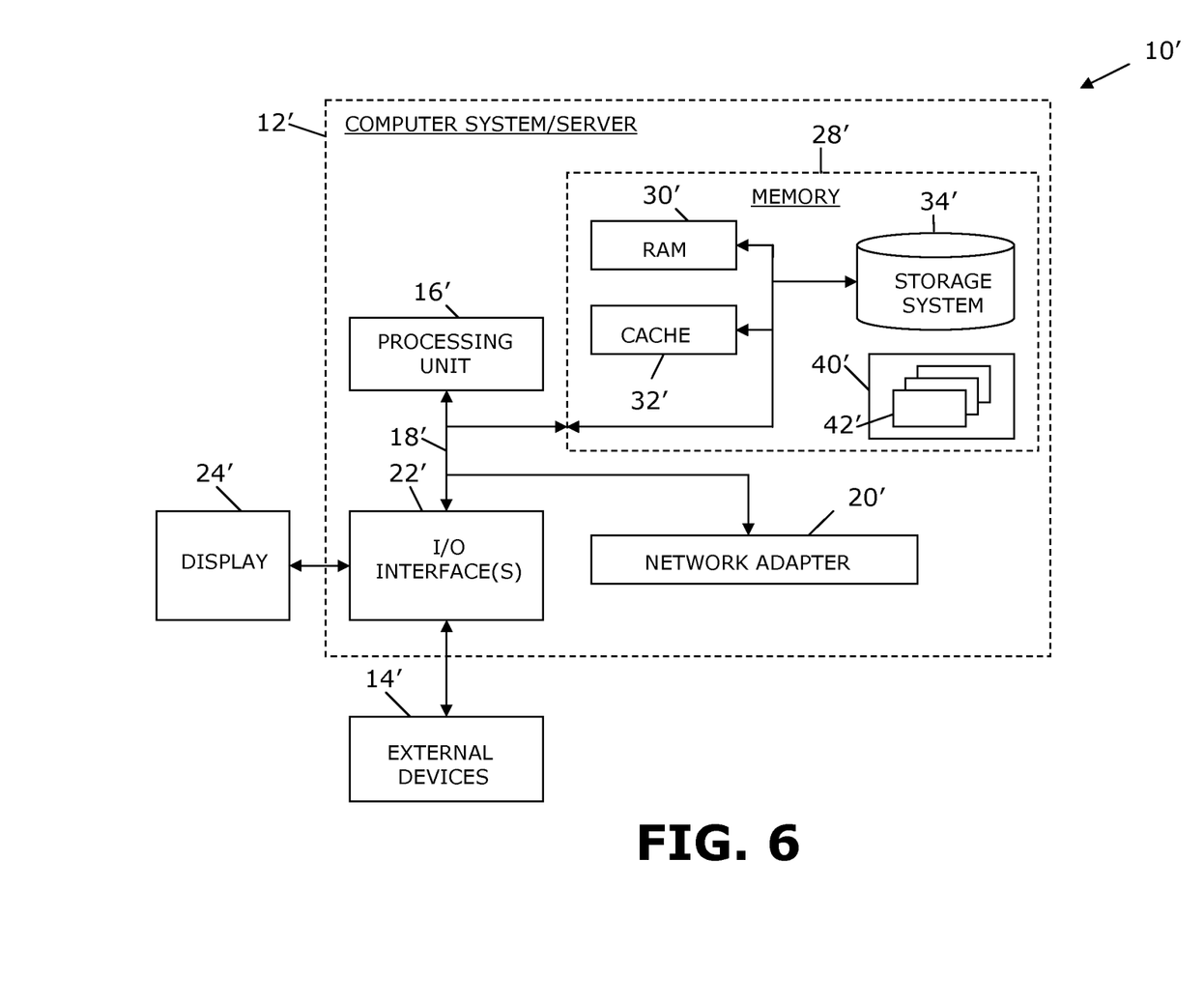
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited took, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of identifying related data in different data sets to assist in searching the data sets, said method comprising:
utilizing at least one processor to execute computer code configured to perform the steps of:

accessing a first structured data asset and a second unstructured data asset;

identifying entities common to the first and second data assets, wherein the identifying comprises extracting structured entities from the first structured data asset, tokenizing the second unstructured data asset, and performing a search using the tokenized second unstructured data asset with respect to the extracted structured entities;

determining a non-tangible score for a relationship between the first and second data assets, wherein the non-tangible score is based on the identified common entities and wherein the non-tangible score identifies a similarity between the first structured data asset and the second unstructured data asset;

determining one or more relationship contexts for the relationship between the first and second data assets; and using the relationship score and one or more relationship contexts to join at least a portion of each of the first and second data assets as a basis for subsequent searching.

2. The method according to claim 1, wherein said identifying entities comprises searching among columnar values in the first and second data assets.

3. The method according to claim 1, wherein said determining a score comprises determining a bi-directional relationship score.

4. The method according to claim 1, wherein said determining a score comprises determining a uni-directional relationship score.

5. The method according to claim 1, wherein said determining one or more relationship contexts comprises determining a uni-directional relationship context score.

6. The method according to claim 1, comprising determining a score for each of the one or more relationship contexts.

7. The method according to claim 6, wherein said using the relationship score and one or more relationship contexts comprises:

applying a threshold to present one or more relationships for searching across both of the first and second assets; said applying of a threshold comprising:

determining a ratio of a score for at least one of the one or more relationship contexts by dividing the relationship context score by the relationship score; and comparing the ratio to the threshold.

8. The method according to claim 7, wherein:

the relationship score is determined with respect to structured entities; and the relationship context score is determined with respect to extracted entities.

9. The method according to claim 1, wherein the relationship score comprises a Jaccard similarity or index score.

10. The method according to claim 1, wherein the relationship score represents a fraction of at least one of the first and second data assets accounted for by the common entities.

11. The method according to claim 1, wherein the one or more relationship contexts comprise a plurality of relationship contexts.

12. An apparatus identifying related data in different data sets to assist in searching the data sets, said apparatus comprising:

at least one processor; and a computer readable storage medium having computer readable program code embodied therewith and executable by the at least one processor, the computer readable program code comprising:

computer readable program code configured to access a first structured data asset and a second unstructured data asset;

computer readable program code configured to identify entities common to the first and second data assets, wherein to identify comprises extracting structured entities from the first structured data asset, tokenizing the second unstructured data asset, and performing a search using the tokenized second unstructured data asset with respect to the extracted structured entities;

computer readable program code configured to determine a non-tangible score for a relationship between the first and second data assets, wherein the non-tangible score is based on the identified common entities and wherein the non-tangible score identifies a similarity between the first structured data asset and the second unstructured data asset;

computer readable program code configured to determine one or more relationship contexts for the relationship between the first and second data assets; and computer readable program code configured to use the relationship score and one or more relationship contexts to join at least a portion of each of the first and second data assets as a basis for subsequent searching.

13. A computer program product for determining relationships between data assets, said computer program product comprising:

computer readable program code configured to access a first structured data asset and a second unstructured data asset;

computer readable program code configured to identify entities common to the first and second data assets, wherein to identify comprises extracting structured entities from the first structured data asset, tokenizing the second unstructured data asset, and performing a search using the tokenized second unstructured data asset with respect to the extracted structured entities;

computer readable program code configured to determine a non-tangible score for a relationship between the first and second data assets, wherein the non-tangible score is based on the identified common entities and wherein the non-tangible score identifies a similarity between the first structured data asset and the second unstructured data asset;

computer readable program code configured to determine one or more relationship contexts for the relationship between the first and second data assets; and computer readable program code configured to use the relationship score and one or more relationship contexts to join at least a portion of each of the first and second data assets as a basis for subsequent searching.

14. The computer program product according to claim 13, wherein identifying entities comprises searching among columnar values in the first and second data assets.

15. The computer program product according to claim 13, wherein the determining of a score comprises determining a bi-directional relationship score.

16. The computer program product according to claim 13, wherein determining a score comprises determining a uni-directional relationship score.

17. The computer program product according to claim 13, wherein determining one or more relationship contexts comprises determining a uni-directional relationship context score.

18. The computer program product according to claim 13, comprising computer readable program code configured to determine a score for each of the one or more relationship contexts.

19. The computer program product according to claim 18, wherein using the relationship score and one or more relationship contexts comprises:
   applying a threshold to present one or more relationships for searching across both of the first and second assets, via:
   determining a ratio of a score for at least one of the one or more relationship contexts by dividing the relationship context score by the relationship score; and
   comparing the ratio to the threshold.

20. A method comprising:
   accessing a first data asset and a second data asset;
   identifying a relationship between the first and second data assets, via identifying entities common to the first and second data assets;
   said identifying of common entities comprising extracting entities from the first data asset, tokenizing the second data asset, and searching among columnar values in the first and second data assets using the tokenized second data asset with respect to the extracted structured entities;
   determining a non-tangible score for the relationship between the first and second data assets, wherein the non-tangible score is based on the identified common entities and wherein the non-tangible score identifies a similarity between the first structured data asset and the second unstructured data asset;
   determining relationship contexts for the relationship between the first and second data assets;
   determining a non-tangible score for each of the relationship contexts; and
   using the relationship score and relationship context scores to join at least a portion of each of the first and second data assets as a basis for subsequent searching, via:
   applying a threshold to present one or more relationships for searching across both of the first and second assets;
   said applying of a threshold comprising determining a ratio of a score for one of the relationship contexts by dividing the relationship context score by the relationship score; and
   comparing the ratio to the threshold.

* * * * *